US008215693B2

(12) United States Patent
Ulita

(10) Patent No.: US 8,215,693 B2
(45) Date of Patent: Jul. 10, 2012

(54) VEHICLE TRUNK COMPARTMENT CARGO MANAGEMENT SYSTEM

(76) Inventor: Greg Ulita, Sterling Heights, MI (US)

( * ) Notice: Subject to any disclaimer, the term of this patent is extended or adjusted under 35 U.S.C. 154(b) by 350 days.

(21) Appl. No.: 12/428,937

(22) Filed: Apr. 23, 2009

(65) Prior Publication Data

US 2010/0270821 A1  Oct. 28, 2010

(51) Int. Cl.
*B60R 7/02* (2006.01)
(52) U.S. Cl. ............... 296/37.1; 296/37.8; 296/37.14; 296/37.16
(58) Field of Classification Search ............ 296/37.1, 296/37.8, 37.14, 37.16, 24.4, 24.43, 39.1, 296/39.2, 69, 65.01; 224/42.34, 42.35, 542, 224/543; 410/77, 94, 95, 121
See application file for complete search history.

(56) References Cited

U.S. PATENT DOCUMENTS

| | | | | |
|---|---|---|---|---|
| 5,061,002 A * | 10/1991 | Saso | ................ | 296/37.3 |
| 5,167,433 A * | 12/1992 | Ryan | ................ | 296/37.1 |
| 5,257,846 A * | 11/1993 | Kanai et al. | ................ | 296/37.14 |
| 5,419,602 A * | 5/1995 | VanHoose | ................ | 296/39.1 |
| 5,456,514 A * | 10/1995 | Justice | ................ | 296/39.2 |
| 5,584,412 A * | 12/1996 | Wang | ................ | 220/500 |
| 5,626,380 A * | 5/1997 | Elson et al. | ................ | 296/39.1 |
| 5,715,978 A * | 2/1998 | Ackeret | ................ | 224/42.33 |
| 5,829,655 A * | 11/1998 | Salopek | ................ | 224/402 |
| 6,015,071 A * | 1/2000 | Adomeit et al. | ................ | 224/42.34 |
| 6,135,527 A * | 10/2000 | Bily | ................ | 296/37.6 |
| 6,235,943 B1 * | 5/2001 | Bajgrowicz et al. | ................ | 568/374 |
| 6,247,741 B1 * | 6/2001 | Seel et al. | ................ | 296/37.14 |
| 6,290,277 B1 * | 9/2001 | Spykerman et al. | ................ | 296/24.43 |
| 6,375,055 B1 * | 4/2002 | Spykerman et al. | ................ | 224/542 |
| 6,422,567 B1 * | 7/2002 | Mastrangelo et al. | ................ | 296/37.1 |
| 6,461,090 B1 * | 10/2002 | Faber et al. | ................ | 410/100 |
| 6,478,356 B1 * | 11/2002 | Wayne | ................ | 296/39.2 |
| 6,488,168 B1 * | 12/2002 | Wang | ................ | 220/7 |
| 6,682,118 B2 * | 1/2004 | Ryan | ................ | 296/39.1 |
| 6,752,304 B1 * | 6/2004 | Hotary et al. | ................ | 224/544 |
| 6,921,119 B2 * | 7/2005 | Haspel et al. | ................ | 296/24.4 |
| 6,986,541 B1 * | 1/2006 | Haack | ................ | 296/39.2 |
| 7,017,977 B1 * | 3/2006 | Kelter | ................ | 296/182.1 |
| 7,093,873 B2 * | 8/2006 | Nilsrud et al. | ................ | 296/37.14 |
| 7,201,421 B2 * | 4/2007 | Reynolds et al. | ................ | 296/37.5 |
| 7,229,115 B2 * | 6/2007 | Wilson et al. | ................ | 296/39.1 |
| 7,350,681 B2 * | 4/2008 | Polburn et al. | ................ | 224/275 |
| 7,513,555 B2 * | 4/2009 | Wilson et al. | ................ | 296/39.1 |
| 7,819,451 B2 * | 10/2010 | Yoshida | ................ | 296/24.4 |
| 2006/0255611 A1 * | 11/2006 | Smith et al. | ................ | 296/37.16 |
| 2008/0100082 A1 * | 5/2008 | Heo | ................ | 296/37.16 |
| 2010/0270821 A1 * | 10/2010 | Ulita | ................ | 296/37.14 |

* cited by examiner

*Primary Examiner* — Glenn Dayoan
*Assistant Examiner* — Gregory Blankenship
(74) *Attorney, Agent, or Firm* — Gregory T. Zalecki

(57) ABSTRACT

A vehicle trunk compartment cargo management system is comprised of a trunk floor panel, a seatback and a pair of dividers. The trunk floor panel provides a vehicle trunk compartment floor surface. The seatback has a pair of pockets. Each pocket secures a seatback flange extending from a divider oriented in an upright position. Each divider has a seatback flange which fits within a seatback pocket to secure the divider in an upright position to the seatback. The dividers are pivotally attached to the trunk floor panel such that they may pivot between an upright position and a closed position. When the dividers are locked into an upright position they form three sub compartments within the vehicle trunk compartment. An optional cargo net fits over the dividers to cover the sub compartments.

20 Claims, 13 Drawing Sheets

VEHICLE TRUNK COMPARTMENT CARGO MANAGEMENT SYSTEM

BACKGROUND

Most passenger motor vehicles have trunk compartments. The trunk compartments are used to carry and transport goods of various sizes and types. At times, one large trunk space is needed. For example, one large trunk space may be needed to carry and transport sporting equipment, such as golf clubs or lawn and garden equipment. At other times smaller trunk compartments are preferred. In fact, a larger trunk space may be problematic. For example, one may desire to transport bagged groceries within a trunk compartment. The groceries would have a tendency to scatter throughout a larger trunk compartment. However, with a smaller trunk compartment the groceries would be retained within a confined position even with turbulent vehicle movement. It may also be desirable to segregate different types of property within a trunk compartment. For example, a person may desire to keep tools separate from groceries and sporting equipment separate from tools and groceries. This can be accomplished by subdividing a larger trunk compartment into smaller sub compartment spaces. The problem with this approach is that if the larger trunk compartment is converted into several smaller sub compartments, the vehicle owner has lost the versatility provided by the larger trunk compartment space. What is needed is a vehicle trunk compartment cargo management system which is capable of providing a large unitary trunk space when needed and which can be quickly converted to several smaller sub compartment spaces. The sub compartment spaces should also be able to be quickly converted back into a larger trunk compartment.

SUMMARY

These needs are satisfied by the vehicle trunk compartment cargo management system described herein. A vehicle trunk compartment cargo management system is comprised of a trunk floor panel, a seatback, a backtrim member and a pair of dividers. The trunk floor panel provides a vehicle trunk compartment floor surface. Preferably, the trunk floor panel has a pair of recesses. The recesses are adapted and shaped to receive the dividers.

The seatback has a pair of pockets on the vehicle trunk compartment side of the seatback. Each pocket is adapted to receive and secure a seatback flange extending from a divider oriented in an upright position. The seatback defines a trunk compartment wall.

The backtrim member is aligned with and contiguous with another trunk compartment wall. The backtrim member may form a trunk compartment wall by itself. Alternatively, the backtrim member may be contiguous with and adjacent to a vehicle trunk compartment structural member which forms a trunk compartment wall. The backtrim member has a pair of pockets. Each backtrim pocket is adapted to releasably receive and secure a backtrim flange extending from a divider oriented in an upright position. The vehicle trunk compartment cargo management system may be constructed without a backtrim member.

Preferably, each pocket of the backtrim member is defined by a plurality of walls. One of the walls is shorter than another. The backtrim pocket walls are shaped, sized and adapted such that their respective divider is capable of snapping into and snapping out of the pocket at the short wall.

Each divider should be shaped to fit within a recess of the trunk floor panel. Each divider is pivotally attached to the trunk floor panel such that each divider may pivot between an upright position with respect to the trunk floor panel and a closed position. Each divider has a seatback flange sized and shaped to fit within a seatback pocket such that the seatback flange secures the divider in an upright position to the seatback. Preferably, each divider has a backtrim flange sized and shaped to fit within a backtrim member pocket such that the backtrim flange releasably secures the divider in an upright position to the backtrim member. Each divider is further shaped such that sub compartments are formed within the trunk compartment when the dividers are pivoted into an upright position with respect to the trunk floor panel.

Preferably, each divider is pivotally attached to the trunk floor panel by a living hinge extending from that divider. A living hinge may be molded into a divider fabricated from plastic thereby avoiding the need for a separate hinge. The dividers may be identically shaped. This will also reduce the cost of the vehicle trunk compartment cargo management system because only one type of divider, rather than two, will be needed for the system. The divider may be fabricated from an upper half divider and a lower half divider. In order to reduce manufacturing costs, the divider halves may be symmetrical. With this configuration the upper half of the right divider can be used as the lower half of the left divider and the lower half of the right divider may be used as the upper half of the left divider. A plurality of ribs should extend from the inner aspect of one of the divider halves. The divider halves and the ribs should be adapted to be sonically welded together. This will produce a light weight strong divider at a reduced cost.

Optionally, a cargo net may be placed over the three sub compartments comprising the vehicle trunk compartment cargo management system wherein the dividers are raised. One or more locator studs extend from the outer periphery of each divider. They provide a base to which a net locator may be attached. The locator stud should also fit within a trunk floor panel locator stud recess when the divider to which it is attached is in a closed position. Net locators are releasably attached to the locator studs of the dividers. Each net locator is adapted to be releasably fit over a locator stud. Each net locator is adapted to secure and position a net over the dividers when the dividers are in an upright position. The net will then cover the three sub compartments formed within the trunk compartment by the upright dividers. One or more net anchors are attached to each side panel of the trunk compartment. The cargo net is releasably attached to these net anchors. The cargo net is also attached to the net locators.

DRAWINGS

These and other features, aspects, and advantages of the present invention will become better understood with regard to the following description, appended claims, and accompanying drawings where:

DESCRIPTION

Figure 1:
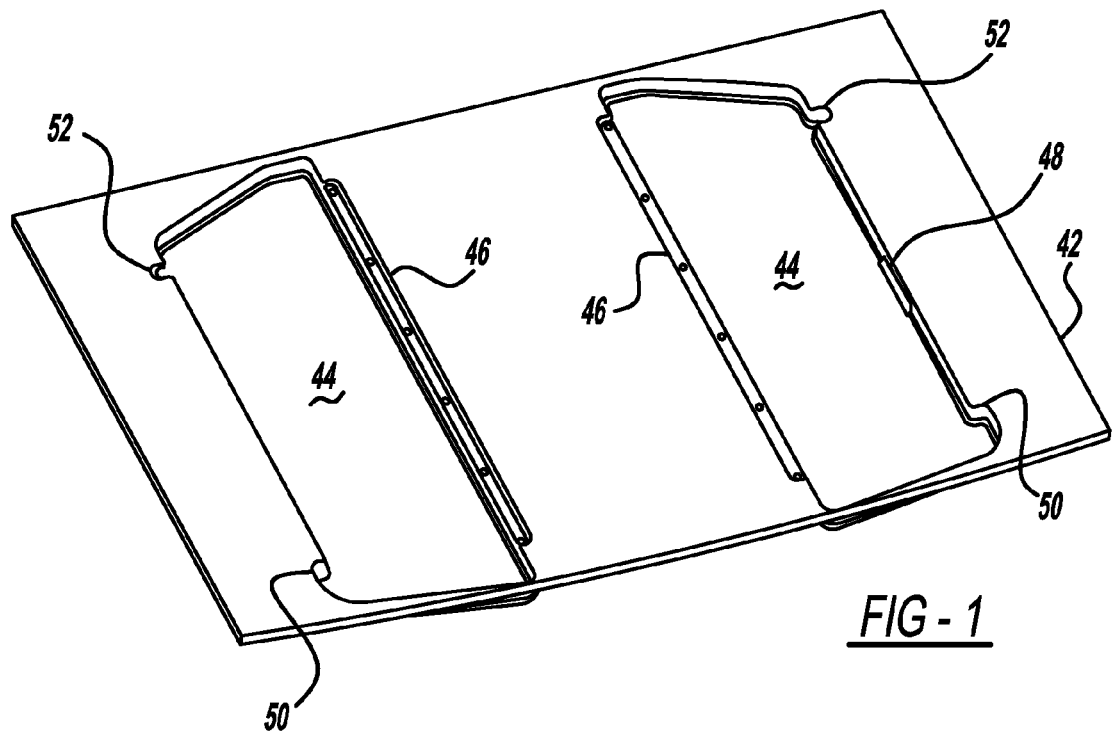
FIG. 1 is a perspective view of a trunk floor panel of a vehicle trunk compartment cargo management system.

The primary intended use of a vehicle trunk cargo management system 40 is to provide a system for quickly dividing the trunk compartment of a subcompact automobile into three sub compartments 78. The system is also reversible. The three sub compartments 78 may be quickly reconverted into one larger trunk compartment. The preferred embodiment of a vehicle trunk compartment cargo management system 40 is comprised of a trunk floor panel 42, a seatback 54, a backtrim member 60 and a pair of dividers 68.

Figure 2:
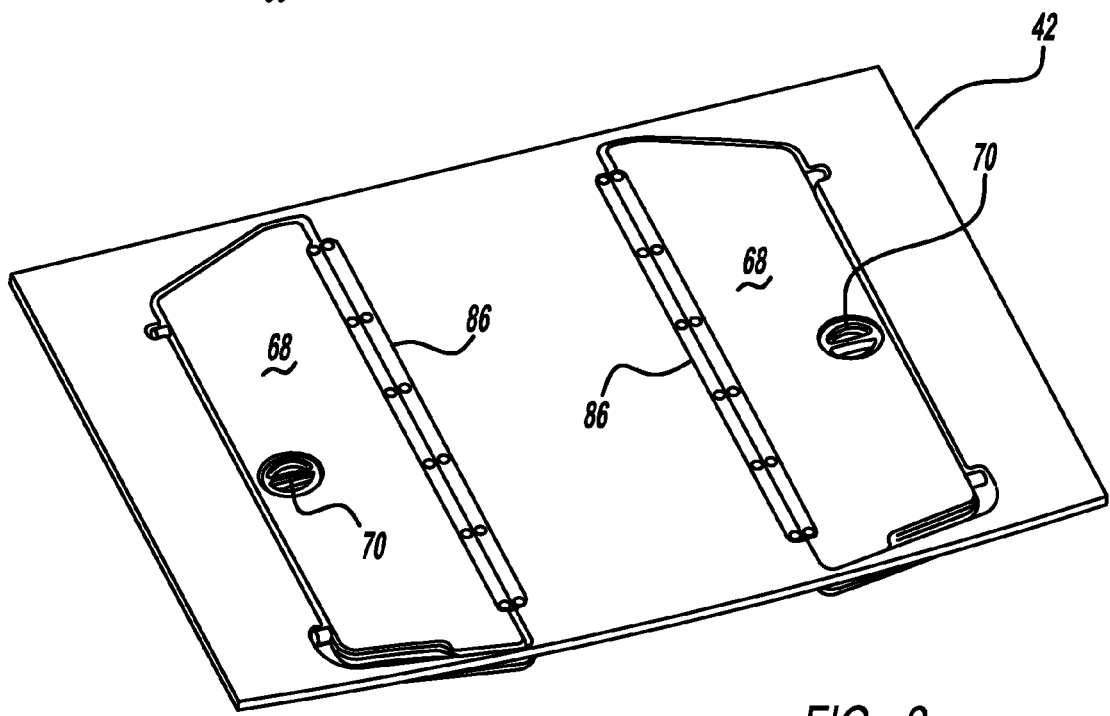
FIG. 2 is a perspective view of the trunk floor panel of FIG. 1 illustrating dividers attached to the floor panel by living hinges riveted into place.
Figure 3:
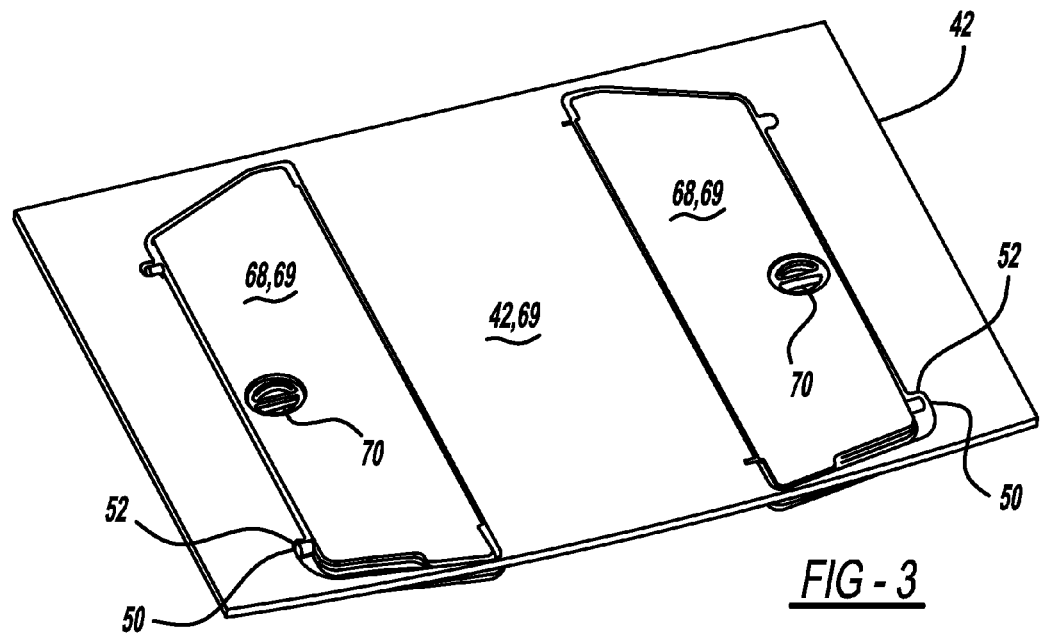
FIG. 3 is a perspective view of a trunk floor panel of a vehicle trunk compartment cargo management system, wherein the dividers and the non-recessed surfaces of the trunk floor panel have been covered with a carpet.
Figure 4:
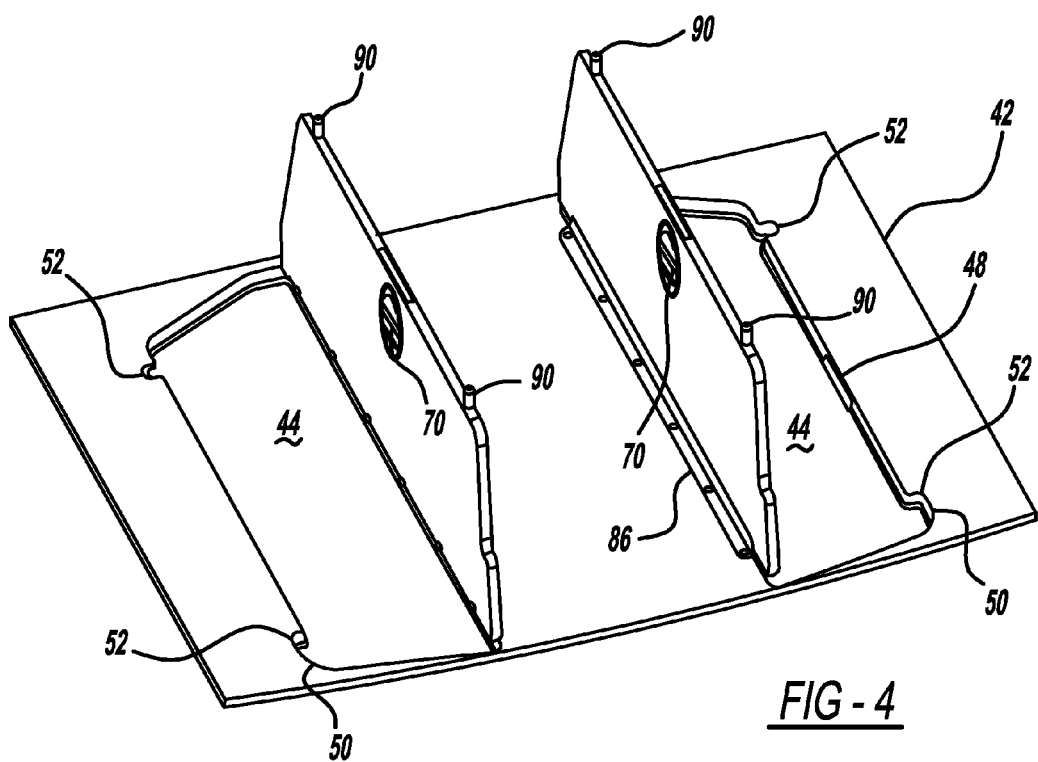
FIG. 4 is a perspective view of the trunk floor panel and hinged dividers of FIG. 2, wherein the dividers have been pivoted into an upright position to split the trunk space into three sub compartments.
Figure 13:
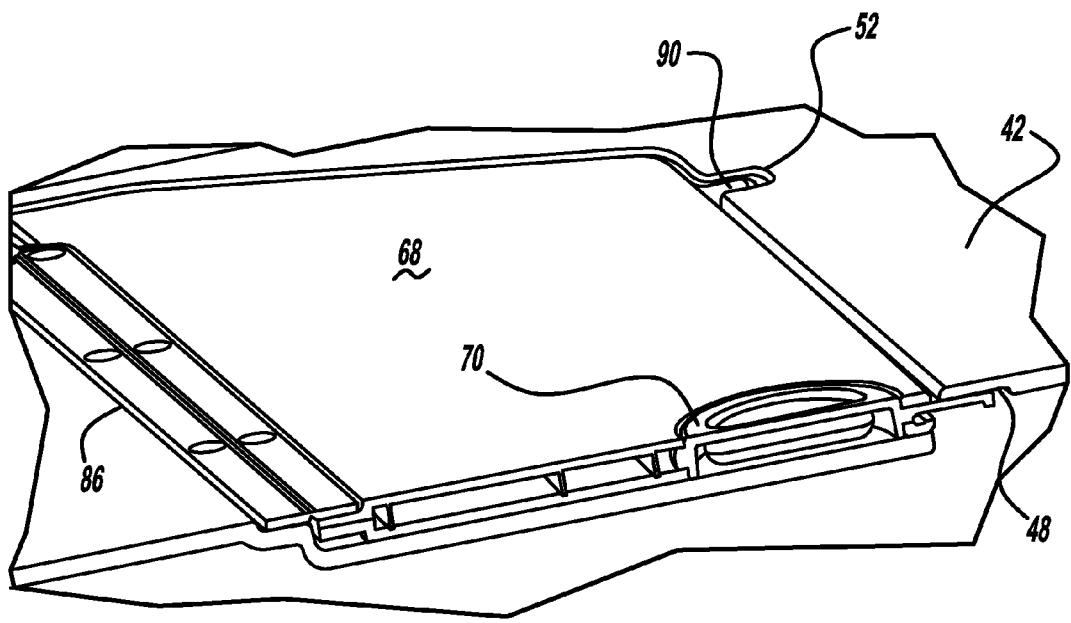
FIG. 13 is a sectional view of two symmetrical dividers illustrating a rotatable knob and tongue positioned within one divider with the tongue locked under the trunk floor panel, as well as a living hinge and metal reinforcement strips pivotally attaching a divider to the trunk floor panel.
Figure 14:
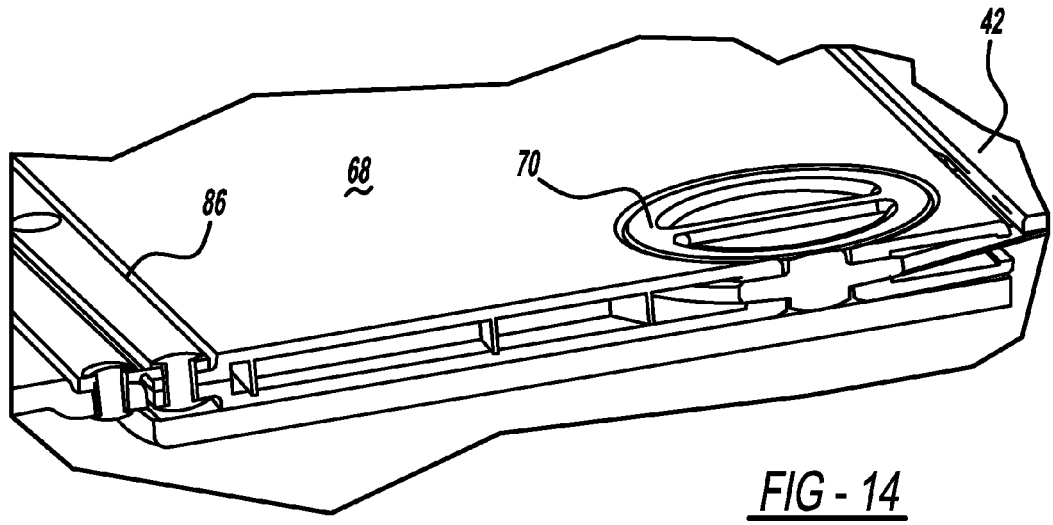
FIG. 14 is a sectional view showing another type of hinge attached to the trunk floor panel.

The trunk floor panel 42 provides a floor for the vehicle trunk compartment. It may be fabricated from steel, aluminum, plastic, or any other material suitable for use as a trunk floor panel 42. The trunk floor panel 42 has a pair of divider recesses 44, as shown in FIG. 1. Each divider recess 44 is shaped to receive a divider 68 such that the divider 68 and the trunk floor panel 42 may form one flat floor surface, as shown in FIG. 2. The trunk floor panel 42 has a pair of hinge recesses 46. Each hinge recess 46 is shaped to receive a hinge 86 which is attached to a divider 68, as shown in FIG. 2. The hinge 86 and the hinge recess 46 should be shaped such that the hinge 86 is also a part of a flat floor surface when the divider 68 to which it is attached lies within its respective divider recess 44. The trunk floor panel 42 has a pair of tongue openings 48. Each divider recess 44 has a tongue opening 48. Each tongue opening 48 should be positioned on a vertical outer aspect of a divider recess 44, as shown in FIG. 4. The tongue openings 48 are adapted to receive a tongue extending from a rotatable knob and tongue 70 integrated into each divider 68. When a tongue extending from a rotatable knob and tongue 70 integrated into a divider extends through a tongue opening 48 of the floor panel 42, the divider 68 to which the tongue is attached is locked into a closed flat position, as shown in FIG. 13 and FIG. 14. Preferably, a hand access recess 50 is incorporated into each divider recess 44, as shown in FIG. 2 and FIG. 4. When a divider 68 lies within a divider recess 44 the hand access recess 50 provides an area wherein a person may insert his or her hand in order to raise the divider 68. Each hand access recess 50 is adapted and shaped to facilitate manual lifting of a divider 68 by permitting the fingers of a hand to be inserted under a flat lying divider 68. Preferably, locator studs 90 also extend from each divider 68, as described below. Locator stud recesses 52 are incorporated into each divider recess 44 of the trunk floor panel 42 to accommodate locator studs 90 extending from the dividers 68, as shown in FIG. 2 and FIG. 4. The recesses and openings of the trunk floor panel may be fabricated by a stamping operation for metallic floor panels 42 or by a molding operation for plastic floor panels 42.

Figure 5:
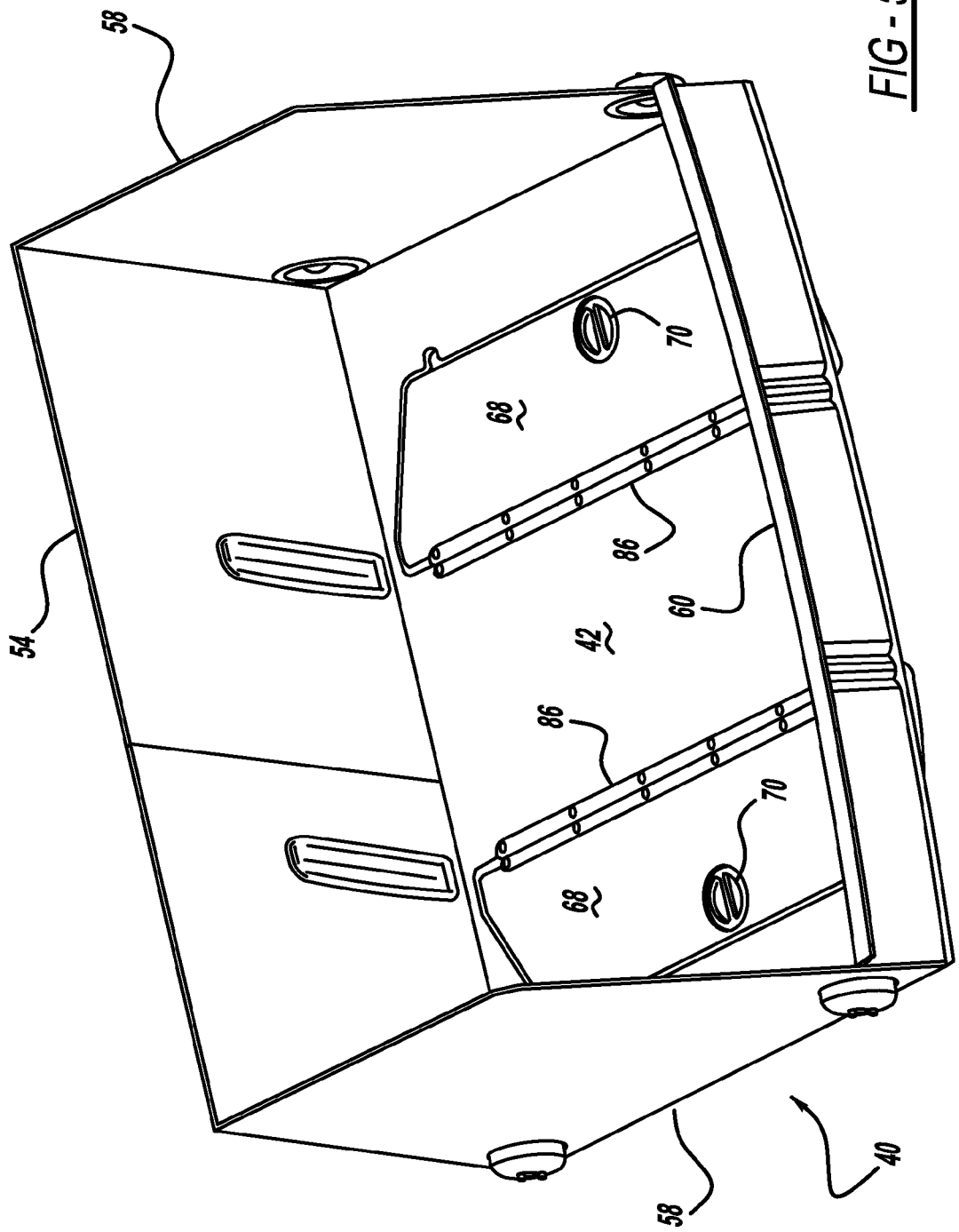
FIG. 5 is a perspective view of the trunk floor panel and hinged dividers of FIG. 2 which also shows a seatback, two side panels and a backtrim member forming a vehicle trunk compartment.
Figure 11:
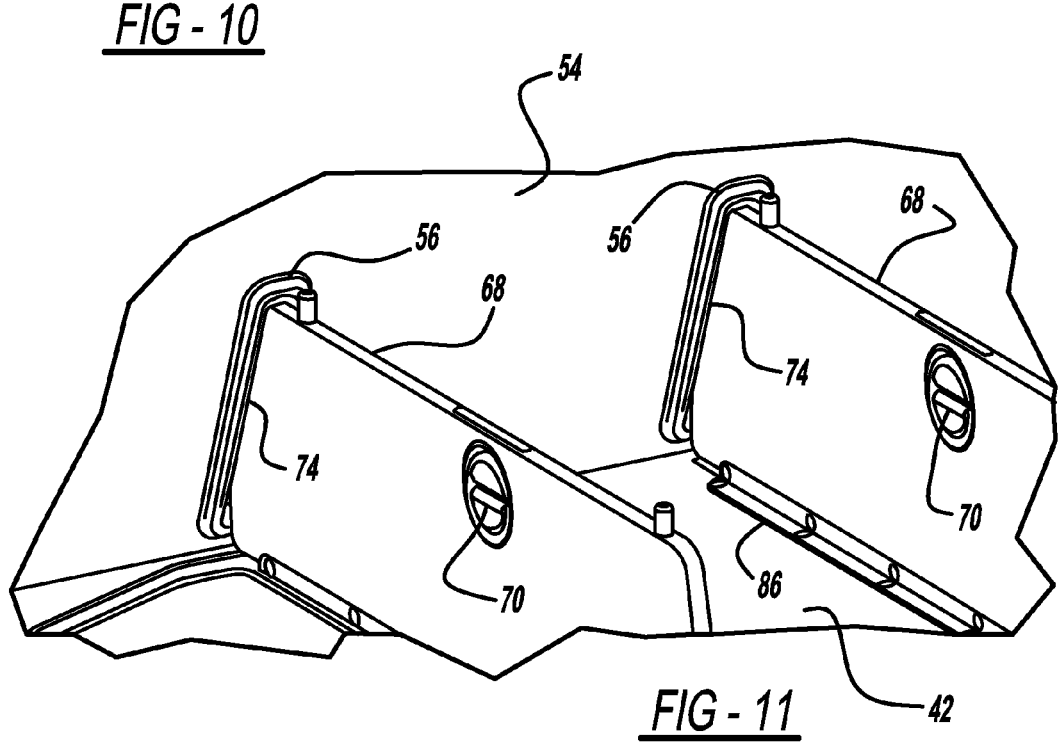
FIG. 11 is an enlarged view of the vehicle trunk compartment cargo management system of FIG. 6 illustrating the divider to seatback interface.

The seatback 54 is a conventional vehicle seat back 54 with a pair of seatback pockets 56 fabricated onto that portion of the seatback 54 which forms an interior trunk compartment wall, as shown in FIG. 5. A seatback flange 74 extends from one side of each divider 68, as described below. Each seatback pocket 56 is adapted to receive and secure a seatback flange 74 when the divider 68 is oriented in an upright position and when the seatback 54 defines a trunk compartment wall. The seatback pockets 56 may be molded from plastic. Preferably, the seatback pockets 56 are cup shaped. The seatback flange 74 of a divider fits within the central portion of the cup shape. The walls of the cup shaped configuration surround the seatback flange 74 and retain it within a vertical position, as shown in FIG. 11. Typical automobile seatbacks pivot between a flat position and a locked vertical position which is orthogonal to the flat position. The pivoting functions of the seatback 54 and the dividers 68 allow the seatback flange 74 of a divider 68 to be easily locked into a seatback pocket 56 of the seatback 54.

Figure 12:
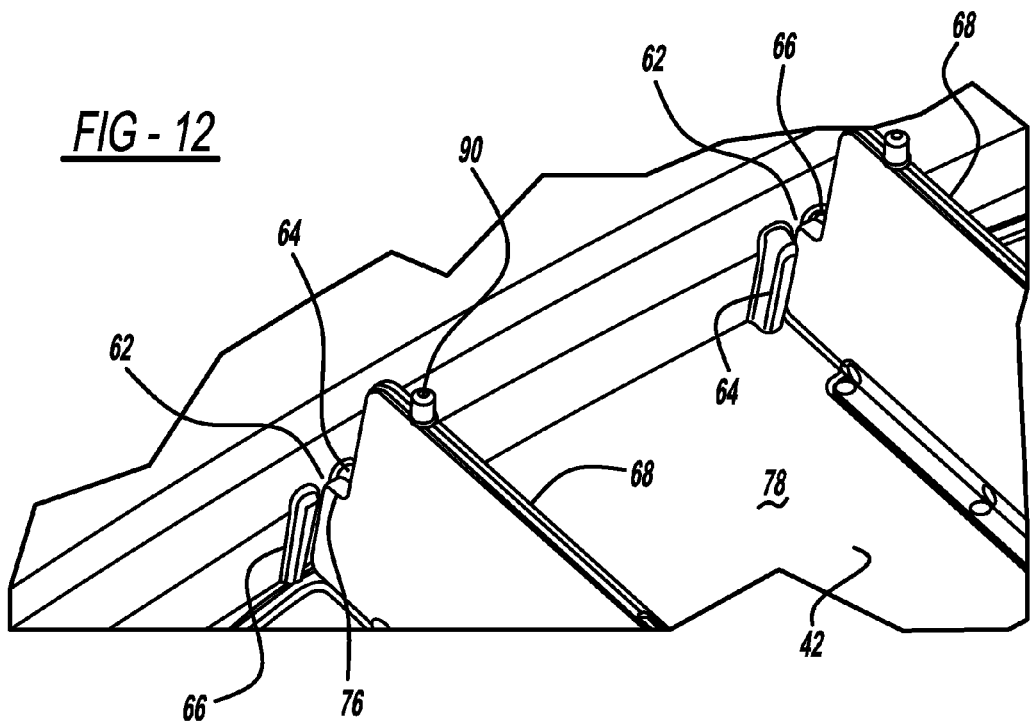
FIG. 12 is an enlarged view of the vehicle trunk compartment cargo management system of FIG. 6 illustrating the divider to backtrim interface.

The backtrim member 60 is aligned with and contiguous with another trunk compartment wall, as shown in FIG. 5. The backtrim member 60 may form a trunk compartment wall by itself. It may also serve as trim to an adjacent contiguous trunk compartment wall. The backtrim member 60 may be molded from plastic. The backtrim member 60 has two backtrim member pockets 62. A backtrim flange 76 extends from one side of each divider 68, as shown in FIG. 12. Each backtrim pocket 62 is adapted to releasably receive and secure a backtrim flange 76 extending from a divider 68 when the divider is oriented in an upright position. The preferred backtrim pocket 62 is comprised of two walls. One of the walls is a high wall 64. The high wall 64 is high enough so that it prevents its associated divider 68 and backtrim flange 76 from rotating more than 90°. In other words, the divider 68 may lie flat or it may be rotated into a vertical position such that its backtrim flange 76 fits within the backtrim pocket 62. However, the high wall 64 of the backtrim pocket 62 prevents further rotation of the divider beyond a vertical orientation. The short wall 66 of each backtrim pocket 62 is shaped, sized and adapted such that it is capable of locking a divider 68 into a vertical orientation by retaining the backtrim flange 76 of the divider 68 between the high wall 64 and the short wall 66 of the backtrim pocket 62, as shown in FIG. 12. However, the material and shape of the short wall 66 and the backtrim member 60 are such that the divider 68 may be snapped into and snapped out of a locked position wherein the backtrim flange 76 of the divider 68 is locked between the high wall 64 and the short wall 66 of the backtrim pocket 62.

Each divider 68 is shaped to fit within a recess 44 of the trunk floor panel 42. When the divider 68 rests within its respective divider recess 44 of the trunk floor panel 42, the trunk floor panel 42 and the divider 68 form one flat floor surface. Each divider 68 is pivotally attached to the trunk floor panel 42. Preferably, the divider 68 is pivotally attached to the trunk floor panel 42 with a hinge 86. The hinge 86 is positioned within a trunk floor panel hinge recess 46. The dividers 68 are adapted to pivot between an upright position perpendicular to the trunk floor panel 42 and a closed position. In the closed position each divider 68 fits within the trunk floor panel divider recess 44 such that the trunk floor panel 42 and the divider 68 have a common coplanar flat upper surface. In this configuration the hinge 86 and the trunk floor panel 42 should also have a common coplanar flat surface.

Figure 18:
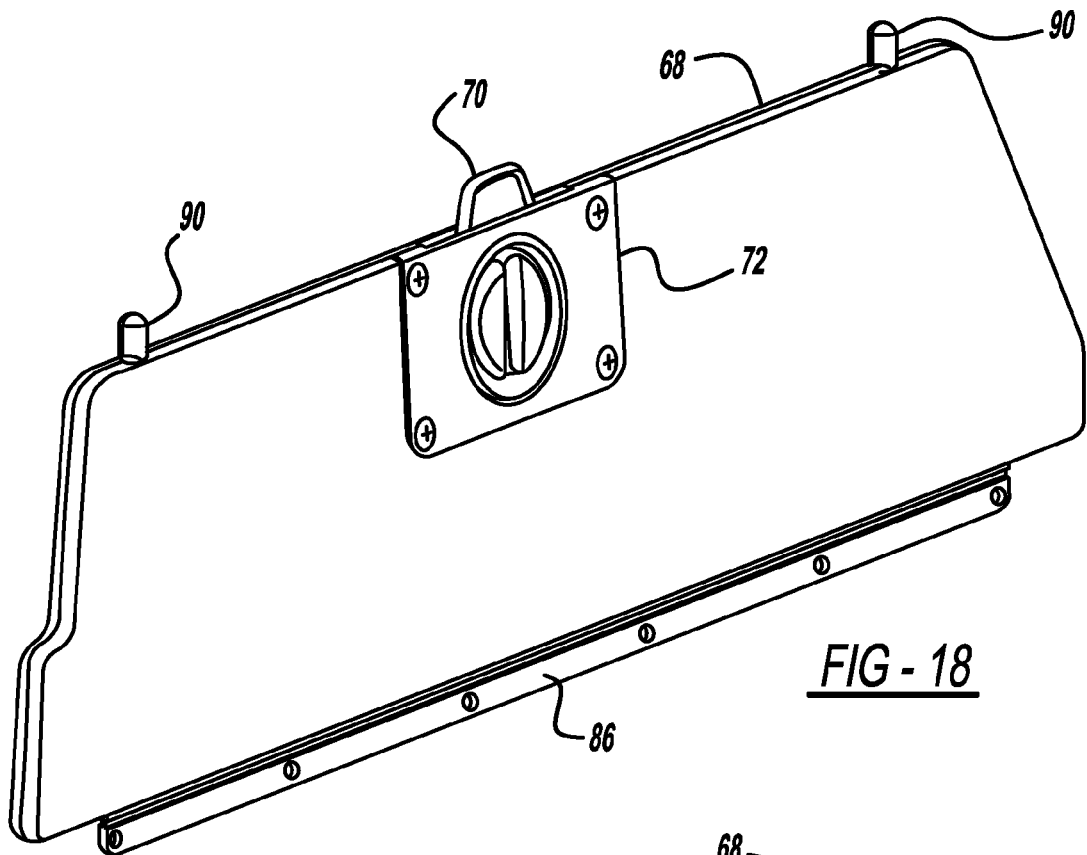
FIG. 18 is a perspective view of a divider of a type as shown in FIG. 17 wherein the rotatable knob is covered by a removable cover to aid in knob servicing.

Preferably, each divider 68 has an integrated rotatable knob and tongue 70. This is illustrated in FIG. 14 in FIG. 15. The knob is adapted to be capable of rotation. When the knob is rotated an attached tongue moves. If the knob is rotated such that the tongue lies within the divider 68, the divider 68 is not secured to the trunk floor panel 42 and the divider may be pivoted between a closed position wherein the divider 68 fits within a divider recess 44 of the trunk floor panel 42 and an upright position wherein the divider is perpendicular to the trunk floor panel 42. The knob and tongue 70 are also adapted such that the knob may be rotated to position the tongue through the tongue opening 48 of the trunk floor panel 42 and under the trunk floor panel 42. When the tongue is so positioned, the divider 68 is locked into a flat closed position, as shown in FIG. 13. The rotatable knob and tongue 70 of a divider 68 should have a removable knob cover 72, as shown in FIG. 18. This will permit the rotatable knob and tongue 70 to be repaired by facilitating access to the rotatable knob and tongue 70.

Figure 6:
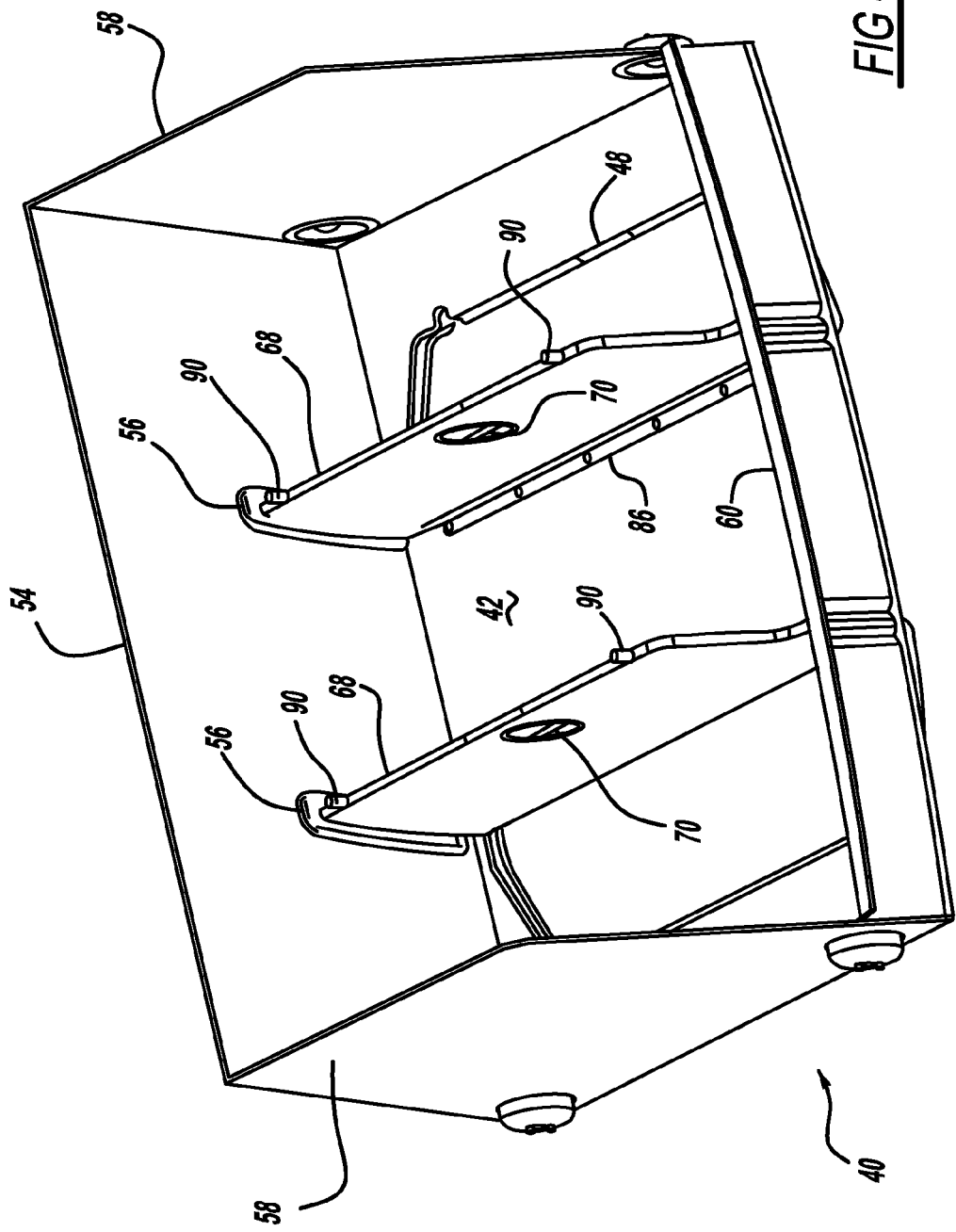
FIG. 6 is a perspective view of the trunk floor panel, seatback, two side panels and hinged dividers of FIG. 5, wherein the dividers have been locked into an upright position to form three sub compartments within the vehicle trunk compartment.
Figure 8:
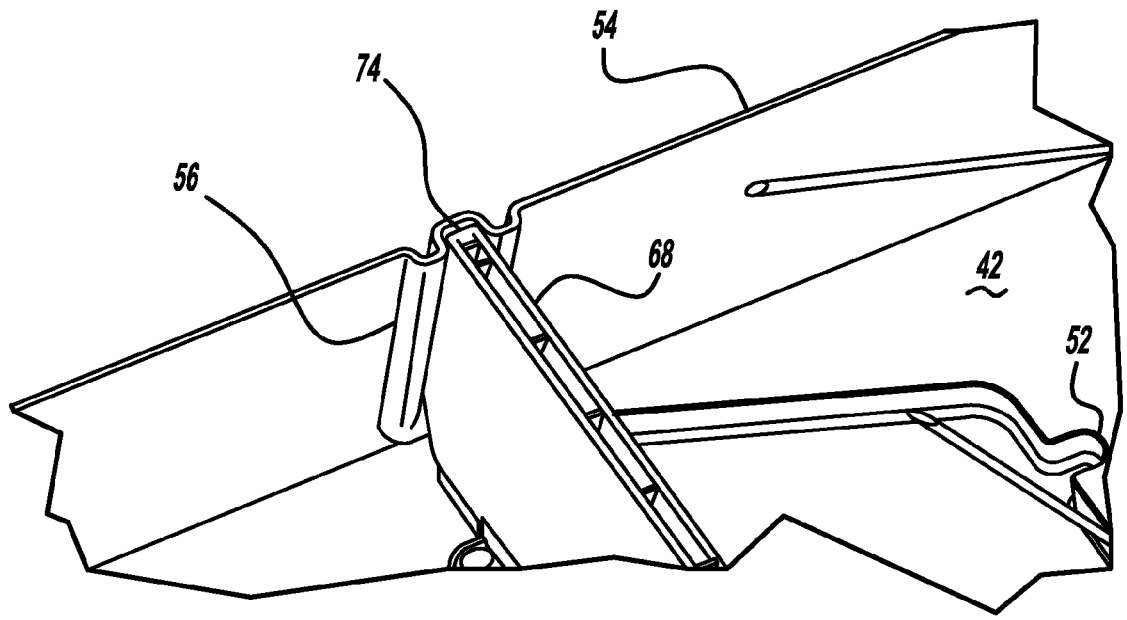
FIG. 8 is a sectional view of the interface between a divider and a seatback pocket of the vehicle trunk compartment of FIG. 6.
Figure 9:
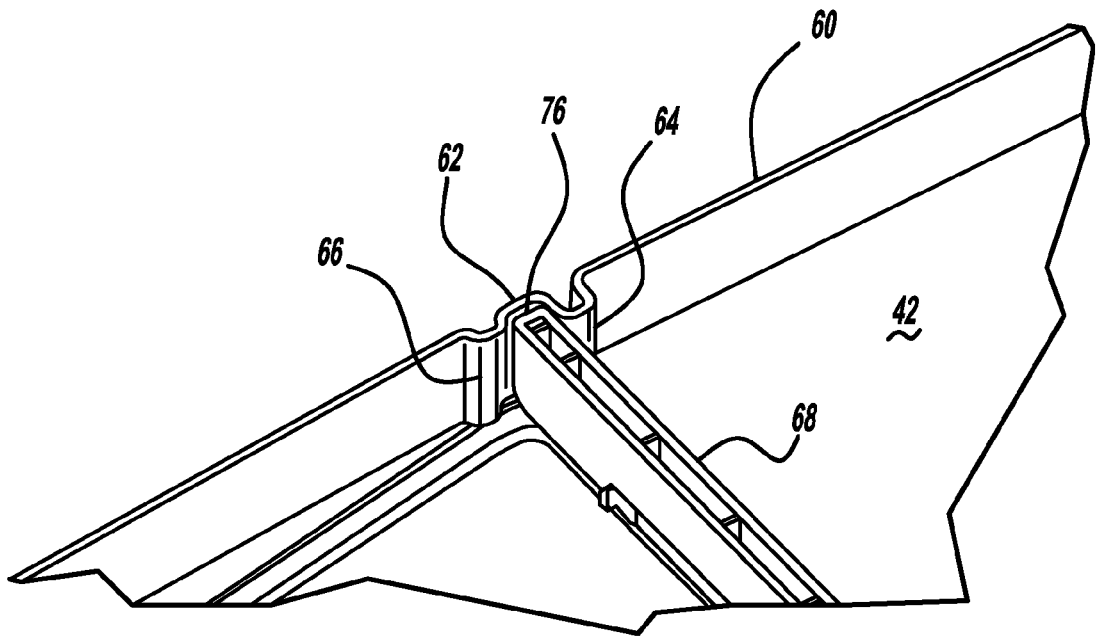
FIG. 9 is a sectional view of the interface between a divider and a backtrim pocket of the vehicle trunk compartment of FIG. 6.
Figure 10:
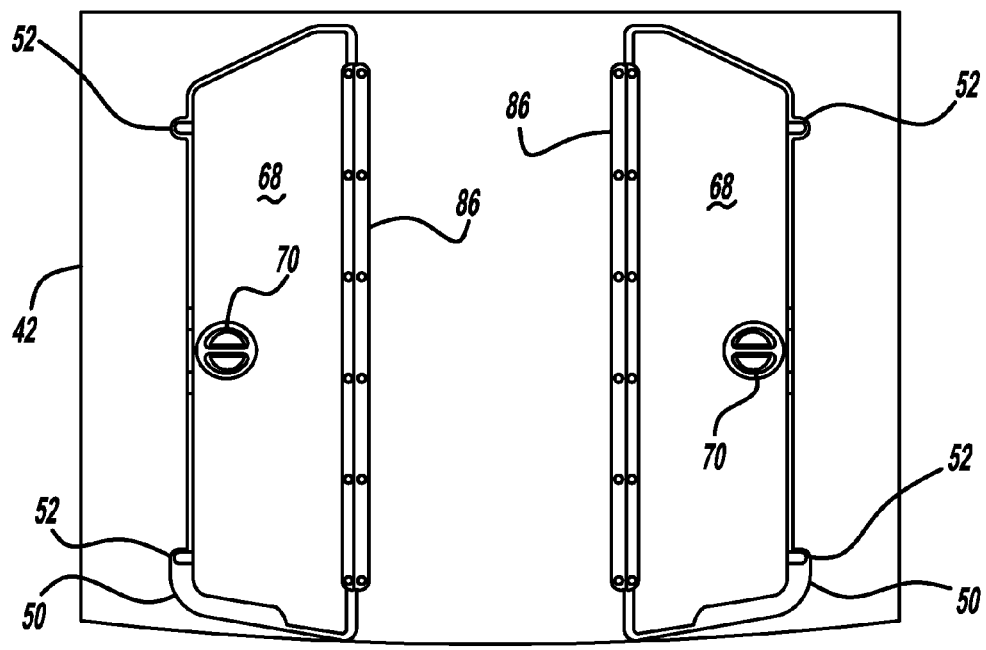
FIG. 10 is a plan view showing a pair of dividers each positioned within a trunk floor panel divider recess.

Each divider 68 has a seatback flange 74. The seatback flange 74 is sized and shaped to fit within a seatback pocket 56 such that the seatback flange 74 secures the divider 68 in an upright position to the seatback 54. This is illustrated in FIG. 6, FIG. 8 and FIG. 11. The seatback pocket 56 is adapted to lock the seatback flange 74 within the seatback pocket 56. In order to properly position and lock a divider 68 into a vertical open position, the seatback 54 may be temporarily pivoted out-of-the-way to permit proper positioning of the divider 68. After proper divider 68 positioning is obtained, the seatback 54 may be pivoted back into a locked position which will also lock the seatback flange 74 into the seatback pocket 56.

Each divider 68 also has a backtrim flange 76. The backtrim flange 76 is sized and shaped to fit within a backtrim member pocket 62 such that the backtrim flange 76 releasably secures the divider in an upright position to the backtrim member 60. The backtrim flange 76 is adapted to snap into the backtrim pocket 62 at the short wall 66 of the backtrim pocket 62. After being snapped into this position the backtrim flange is locked to the backtrim member 60. The backtrim flange 76 is adapted to snap out of the backtrim pocket 62 at the short wall 66 of the backtrim pocket 62. In other words, when a closing pivotal force is applied to a divider 68 secured to the backtrim member 60, the backtrim flange 76 will snap out of the backtrim pocket 62 at the short wall 66, thereby allowing the divider to be moved from an open vertical position to a closed flat position, without the necessity of repositioning the backtrim member 60.

Figure 7:
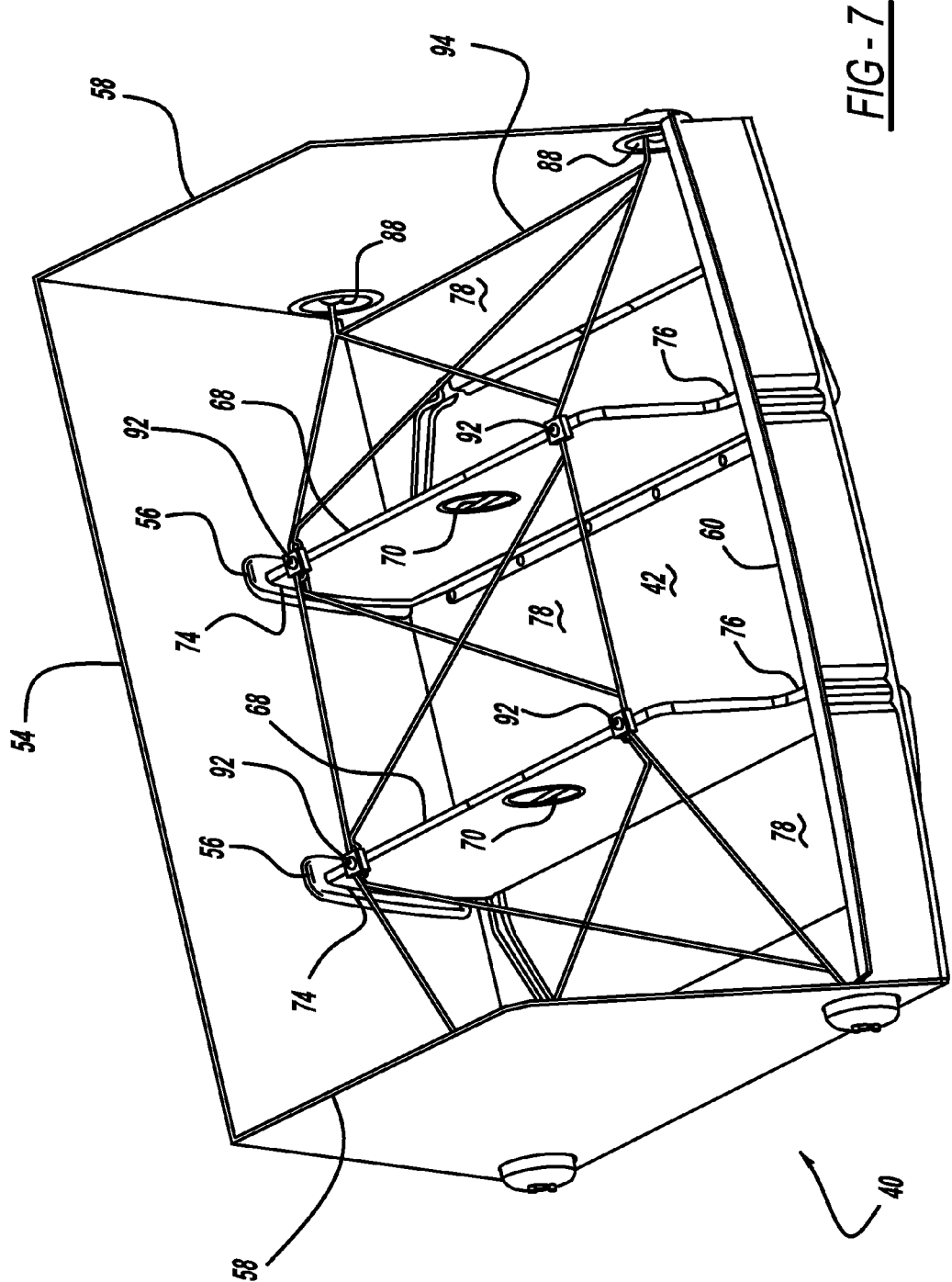
FIG. 7 is a perspective view of the three sub compartments of FIG. 6, further illustrating a cargo net attached to the dividers and the side panels.

The dividers 68 are shaped such that three sub compartments 78 are formed within the trunk compartment when the dividers 68 are pivoted into an upright position perpendicular to the trunk floor panel 42. The three sub compartments 78 formed by the dividers 68 are shown in FIG. 6 and FIG. 7. The seatback 54 and the backtrim member 60 (or an adjacent contiguous structural member) form two outer walls of the trunk compartment. Two vehicle side panels 58 form the other two outer walls of the trunk compartment. Preferably, carpeting 69 covers the trunk floor surface aspects of the trunk floor panel 42 and the dividers 68. The divider 68 carpeting 69 and the trunk floor panel 42 carpeting 69 are separated from each other in order to allow the dividers 68 to pivot between an open and a closed position.

Figure 19:
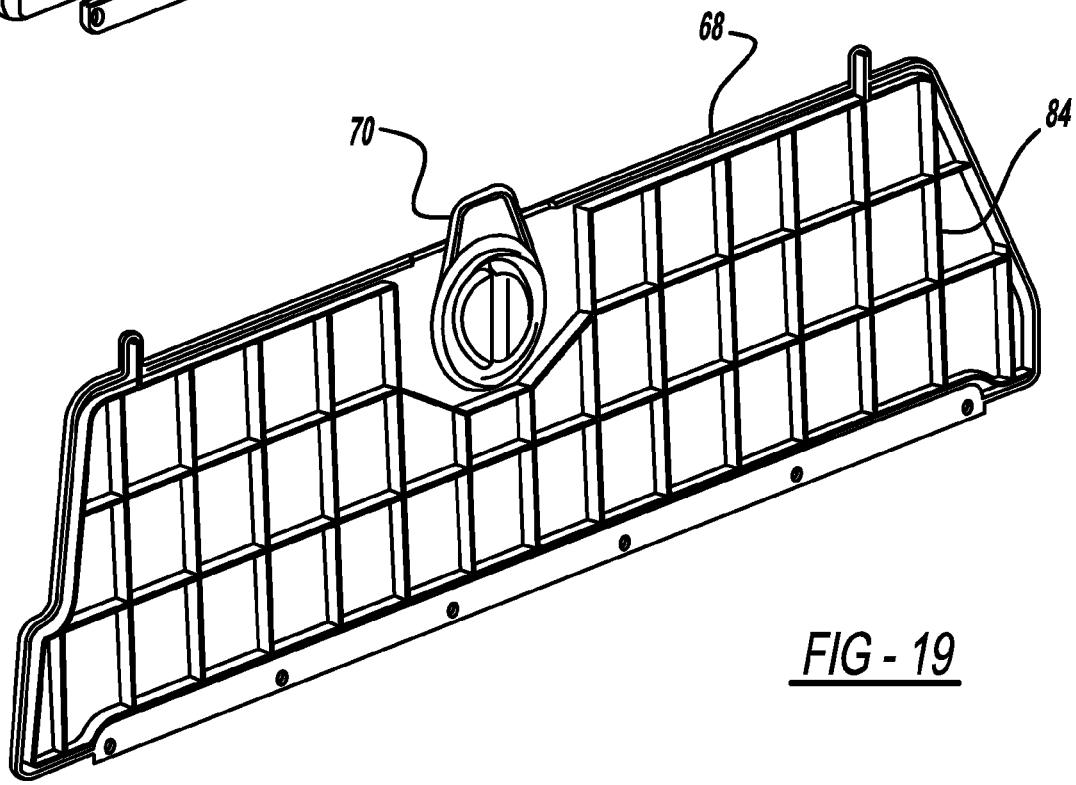
FIG. 19 is a sectional view of the divider of FIG. 18 illustrating internal ribs for sonic welding.

Preferably, the dividers 68 are fabricated from plastic. Divider halves may be molded from plastic with a plurality of ribs 84 perpendicularly extending from one side of one of the dividers 68, as shown in FIG. 19. In this configuration, each divider 68 has an upper half and a lower half. The ribs 84 and the divider 68 halves should be adapted to be sonically welded together. This will facilitate quick, low cost, low weight solid divider 68 construction. The dividers 68 and their subcomponents may be symmetrical. This will allow a lower manufacturing cost because the same parts may be used on each side of the trunk floor panel 42.

The dividers 68 may be pivotally attached to the trunk floor panel 42 with conventional hinges 86. The hinges 86 may be attached with bolts, screws or rivets. The dividers 68 may also be fabricated with an integrated living hinge 86. Integrated living hinges 86 extending from the divider 68 are shown in FIG. 2, FIG. 13, FIG. 17 and FIG. 18. A living hinge 86 is formed onto a divider 68 during a plastic molding process when the divider is fabricated. The use of living hinges 86 reduces the manufacturing cost because separate hinges are not required to pivotally attach the dividers 68 to the trunk floor panel 42.

Figure 15:
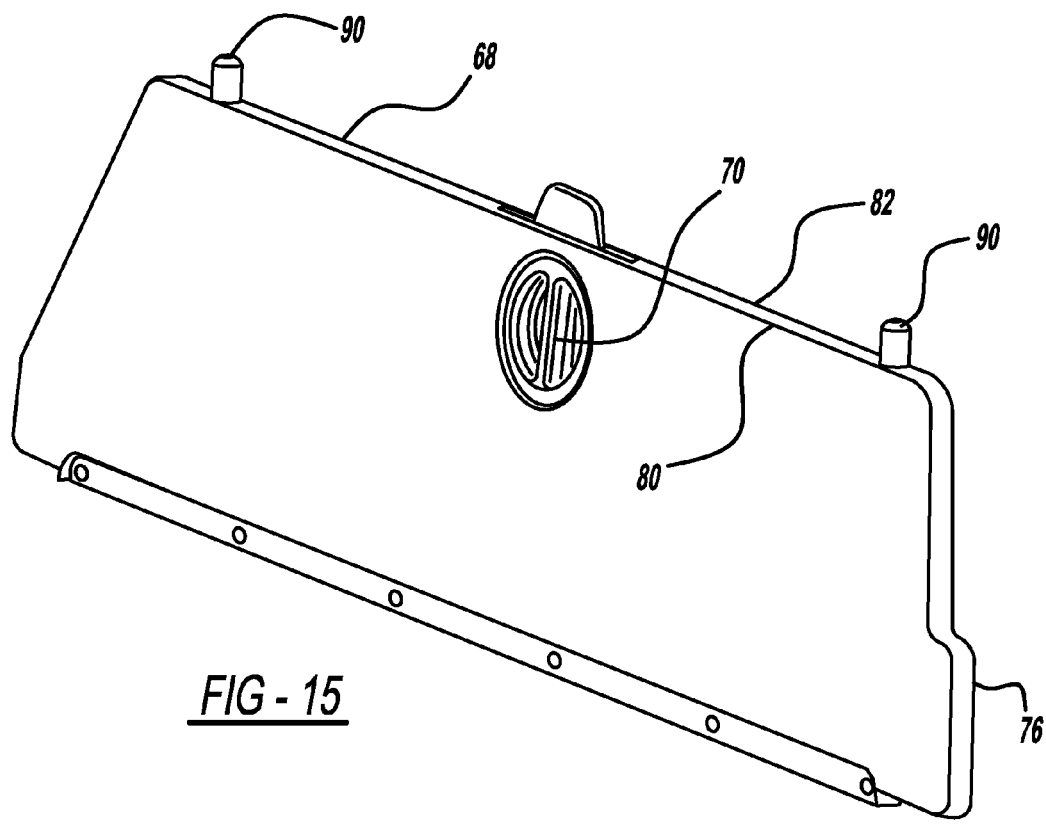
FIG. 15 is a perspective view of one type of a divider fabricated from two symmetrically opposite halves wherein the assembled part orientation (left/right) is dictated by the turn knob orientation.
Figure 16:
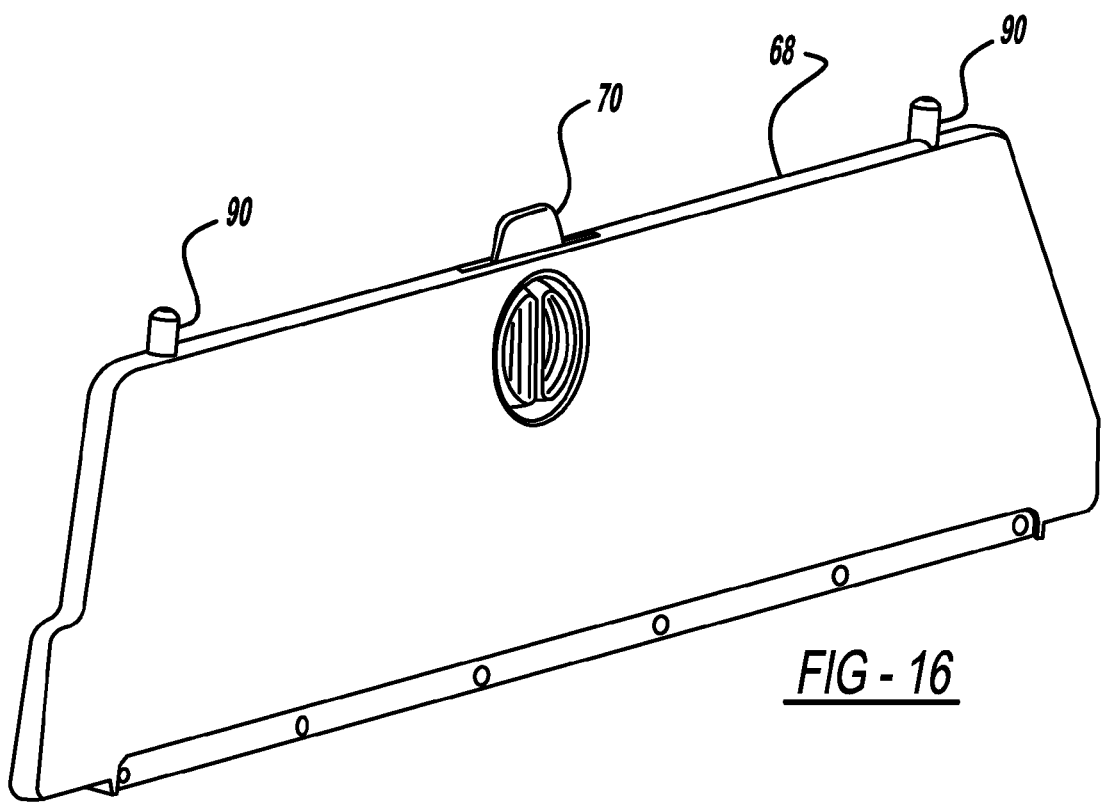
FIG. 16 is a perspective view of a divider of the type shown in FIG. 15 wherein the turn knob is adapted for use on a different side of the floor panel.
Figure 17:
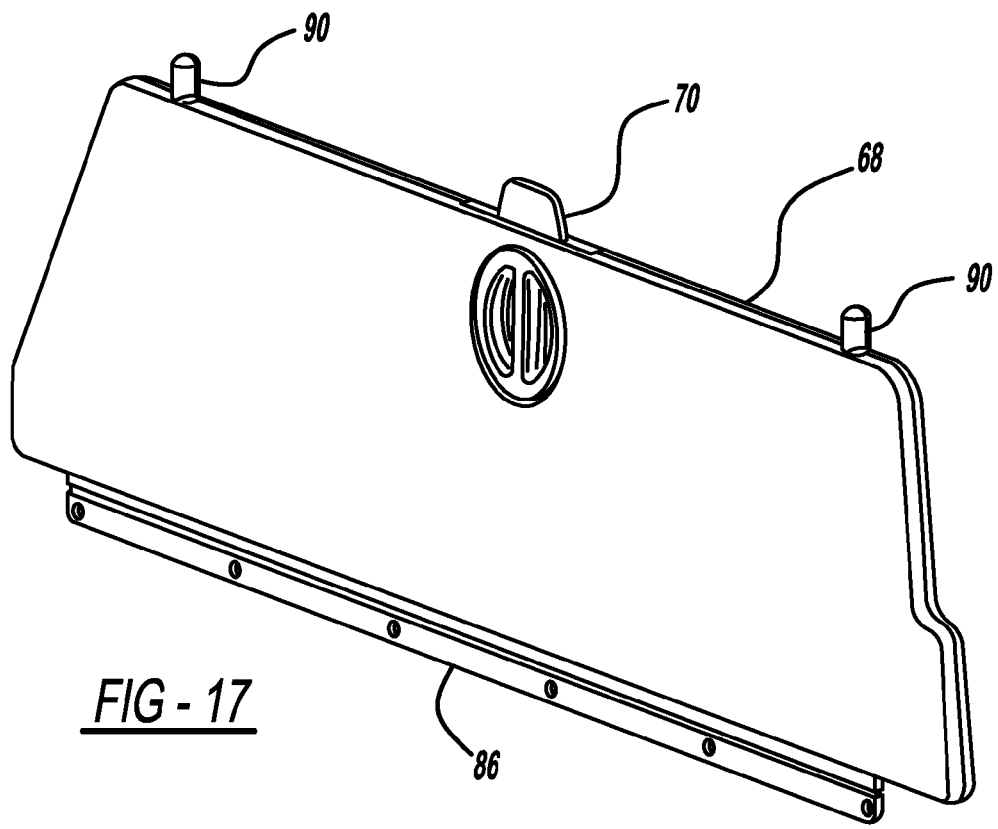
FIG. 17 is a perspective view of a second type of a divider using an integrated living hinge wherein dedicated left and right assemblies are required.

Preferably, the vehicle trunk compartment cargo management system 40 incorporates a cargo net 94. Each divider 68 is equipped with at least one locator stud 90. The locator stud 90 extends from the outer periphery of the divider 68, as shown in FIG. 15. The locator studs 90 should be an integral part of the dividers 68, although this is not absolutely necessary. The locator stud 90 is cylindrical in shape and adapted to receive a net locator 92. The locator stud 90 may have a protruding ridge on its distal (to the divider 68) circumference for releasably securing and attaching a net locator 92. Each locator stud recess 52 of the trunk floor panel 42 is adapted to receive a locator stud 90 when the divider 68 from which it extends is in a closed position.

A net locator 88 is releasably attached to one or more locator studs 90 of the dividers 68. Each net locator 92 is adapted to be releasably fit over a locator stud 90, as shown in FIG. 7. Each net locator 92 is adapted to secure and position a cargo net 94 over the dividers 68 when the dividers are in an upright position such that the cargo net 94 attached to the net locators 92 covers the three sub compartments 78 formed within the trunk compartment when the dividers 68 are pivoted into an upright position perpendicular to the trunk floor panel 42.

Figure 20:
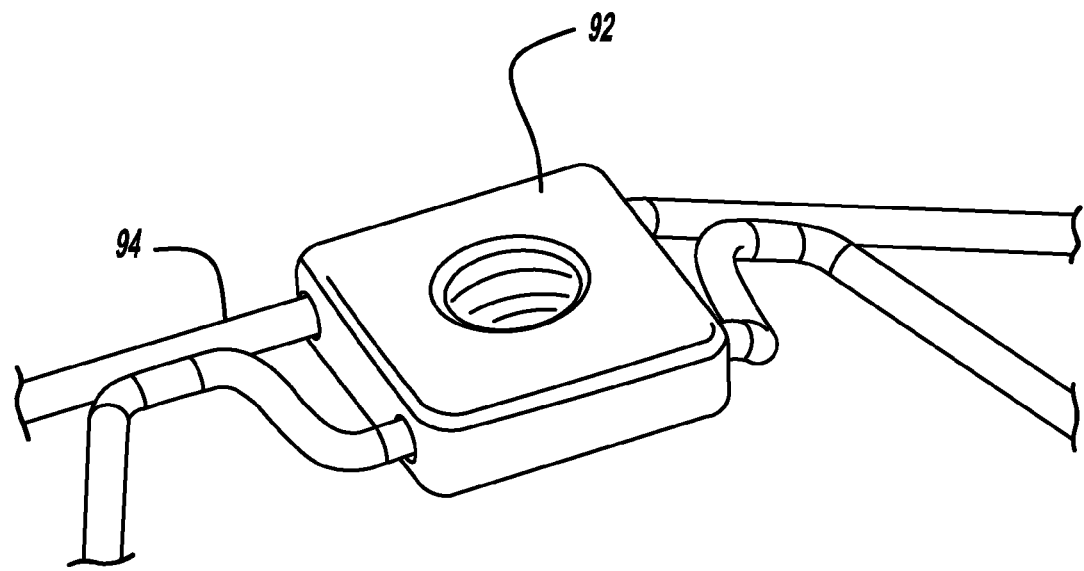
FIG. 20 is a perspective view of a net locator attached to a cargo net.
Figure 21:
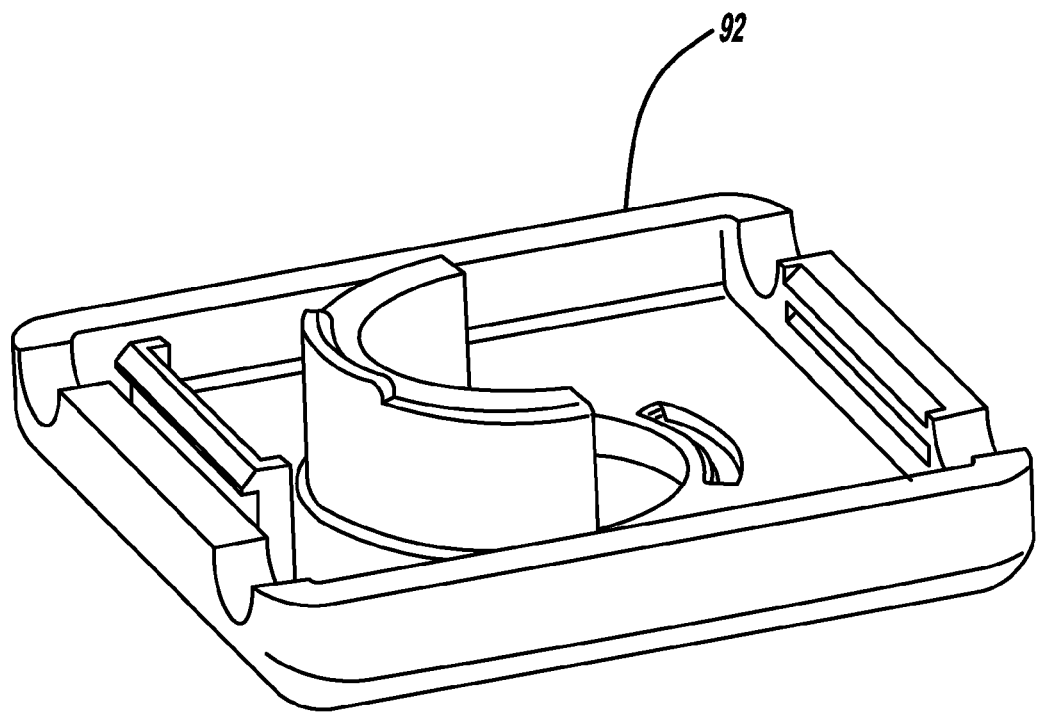
FIG. 21 is a broken away view of the net locator of FIG. 20 illustrating that the net locator is fabricated from two identical parts which are snapped together.
Figure 22:
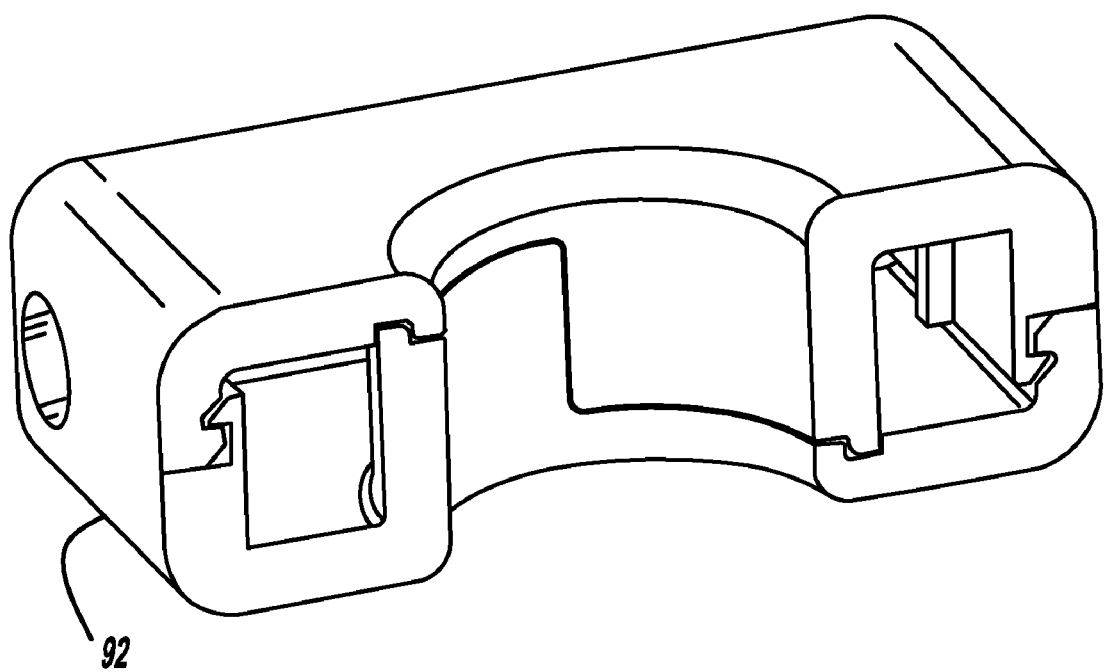
FIG. 22 is a sectional perspective view of the net locator of FIG. 20.

The preferred embodiment of a net locator 92 is shown in FIG. 20, FIG. 21 and FIG. 22. The net locator 92 is fabricated from plastic. It is comprised of two identical parts which are snapped together. One of the two parts which are snapped together is shown in FIG. 21. The net locator 92 has entrance openings to receive the cargo net 94. The symmetrical halves of the net locator 92 are adapted to be releasably locked together. The net locator 92 has a cylindrically shaped opening centrally positioned. The cylindrically shaped opening fits over a locator stud 90 of a divider 68.

Two side panels 58 form two walls of the trunk compartment, as described above. At least one net anchor 88 is attached to each side panel 58. Each net anchor 88 is adapted to releasably secure a cargo net 94. The cargo net 94 is releasably attached to the net anchors 88 on each side panel 58 and net locators 92 which are attached to each divider 68. The cargo net 94 is attached such that it covers the three sub compartments 78 formed within the trunk compartment when the dividers 68 are pivoted into an upright position perpendicular to the trunk floor panel 42.

In order to use the vehicle trunk compartment cargo management system 40 to form three sub compartments 78 within the trunk compartment of a vehicle, the vehicle trunk is first opened to provide access to the trunk compartment. The dividers 68 are unlocked from the trunk floor panel 42 by rotating the knobs of the rotatable knobs and tongues 70 so that the tongues no longer lock the dividers 68 to the trunk floor panel 42. The seatback 54 is unlocked and pivoted to allow the dividers 68 to be positioned perpendicular to the trunk floor panel 42. The dividers 68 are pivoted from their closed positions to vertically oriented open positions; during this procedure the backtrim flange 76 of each divider 68 is snapped into its respective backtrim pocket 62. The seatback 54 is then relocked such that the seatback pockets 56 each engage with a seatback flange 74 of a divider 68.

After the three sub compartments 78 are formed by opening the dividers 68 the cargo net 94 may optionally be positioned to cover the three sub compartments 78 of the vehicle trunk. A plurality of net locators 92 are attached to the cargo net 94. The cargo net 94 is secured to the dividers 68 and the trunk side panels 58. The net locators 92 attached to the cargo net are positioned onto the locator studs 90 which extend from the dividers 68. The net anchors 88 are used to secure the outer periphery of the net to the trunk side panels 58.

The three trunk sub compartments 78 may be quickly converted to one larger trunk compartment. The cargo net 94 is removed by detaching the cargo net 94 from the trunk side panels 58 and by removing the net locators 92 from the locator studs 90. The seatback 54 is unlocked and pivoted to disengage the seatback pockets 56 from the divider seatback flanges 74. The dividers 68 are then snapped out of the backtrim pockets 62 and set into a closed folded position. Optionally, the rotatable knob and tongue 70 may be rotated to lock the divider tongues under the trunk floor panel 42. If desired, the seatback 54 is locked back into its vertical position.

Although the invention has been shown and described with reference to certain preferred embodiments and methods, those skilled in the art undoubtedly will find alternative embodiments and methods obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. A vehicle trunk compartment cargo management system comprising:
    (a) a trunk floor panel providing a vehicle trunk compartment floor surface;
    (b) a seatback having a pair of pockets, each said pocket being adapted to receive and secure a seatback flange extending from a divider oriented in an upright position, said seatback defining a wall of the vehicle trunk compartment; and
    (c) a pair of dividers, each divider having a seatback flange sized and shaped to fit within a seatback pocket such that the seatback flange secures the divider in an upright position to the seatback, each said divider being pivotally attached to the trunk floor panel such that each divider may pivot between an upright position and a closed position, said closed position being substantially parallel to the trunk floor panel.

2. The vehicle trunk compartment cargo management system of claim 1, further comprising:
    (a) a pair of tongue openings each of which opens on a vertical outer aspect of a divider recess of the trunk floor panel for receiving and securing a tongue of a knob and tongue lock; and
    (b) wherein each divider has a rotatable knob and tongue, said tongue extending from the knob and said tongue being shaped, sized and positioned to rotate into a tongue opening of the floor panel for releasably securing the divider to the trunk floor panel.

3. The vehicle trunk compartment cargo management system of claim 1, further comprising:
    (a) a backtrim member aligned with and contiguous with another trunk compartment wall, said backtrim member having a pair of pockets, each said backtrim pocket being adapted to releasably receive and secure a backtrim flange extending from a divider oriented in an upright position;
    (b) wherein each divider has a seatback flange sized and shaped to fit within a seatback pocket such that the seatback flange secures the divider in an upright position to the seatback, each divider having a backtrim flange sized and shaped to fit within a backtrim member pocket such that the backtrim flange releasably secures the divider in an upright position to the backtrim member.

4. The vehicle trunk compartment cargo management system of claim 1, further comprising:
    (a) a pair of side panels forming two walls of the trunk compartment;
    (b) at least one net anchor attached to each side panel, each said net anchor being adapted to releasably secure a cargo net;
    (c) at least one locator stud extending from the outer periphery of each divider for receiving a net locator;
    (d) a net locator releasably attached to the at least one locator stud of each divider, each net locator being adapted to be releasably fit over a locator stud, each net locator being adapted to secure and position a net over the dividers when the dividers are in an upright position such that a net attached to the net locators covers the sub compartments formed within the trunk compartment when the dividers are pivoted into an upright position perpendicular to the trunk floor panel; and (e) a cargo net releasably attached to the at least one net anchor attached to each side panel and the at least one net locator attached to each divider such that the cargo net covers the three sub compartments formed within the trunk compartment when the dividers are pivoted into an upright position perpendicular to the trunk floor panel.

5. The vehicle trunk compartment cargo management system of claim 3, wherein each pocket of the backtrim member is defined by a plurality of walls, wherein one of the walls is shorter than another and wherein the backtrim pocket walls are shaped, sized and adapted such that their respective divider is capable of snapping into and snapping out of the pocket at the short wall.

6. The vehicle trunk compartment cargo management system of claim 1, wherein each divider is identically shaped and sized.

7. A vehicle trunk compartment cargo management system comprising:
(a) a trunk floor panel having a pair of recesses for receiving a pair of dividers;
(b) a seatback having a pair of pockets, each said pocket being adapted to receive and secure a seatback flange extending from a divider oriented in an upright position, wherein said seatback defines a trunk compartment wall;
(c) a backtrim member aligned with and contiguous with another trunk compartment wall, said backtrim member having a pair of pockets, each said backtrim pocket being adapted to releasably receive and secure a backtrim flange extending from a divider oriented in an upright position;
(d) a pair of dividers, each said divider being shaped to fit within a recess of the trunk floor panel, each said divider being pivotally attached to the trunk floor panel such that each divider may pivot between an upright position with respect to the trunk floor panel and a closed position, each divider having a seatback flange sized and shaped to fit within a seatback pocket such that the seatback flange secures the divider in an upright position to the seatback, each divider having a backtrim flange sized and shaped to fit within a backtrim member pocket such that the backtrim flange releasably secures the divider in an upright position to the backtrim member, each said divider being further shaped such that sub compartments are formed within the trunk compartment when the dividers are
pivoted into an upright position with respect to the trunk floor panel.

8. The vehicle trunk compartment cargo management system of claim 7, further comprising:
(a) a pair of side panels forming two walls of the trunk compartment;
(b) at least one net anchor attached to each side panel, each said net anchor being adapted to releasably secure a cargo net;
(c) at least one locator stud extending from the outer periphery of each divider for receiving a net locator;
(d) a net locator releasably attached to the at least one locator stud of each divider, each net locator being adapted to be releasably fit over a locator stud, each net locator being adapted to secure and position a net over the dividers when the dividers are in an upright position such that a net attached to the net locators covers the sub compartments formed within the trunk compartment when the dividers are pivoted into an upright position with respect to the trunk floor panel; and
(e) a cargo net releasably attached to the at least one net anchor attached to each side panel and the at least one net locator attached to each divider such that the cargo net covers the sub compartments formed within the trunk compartment when the dividers are pivoted into an upright position with respect to the trunk floor panel.

9. The vehicle trunk compartment cargo management system of claim 7, wherein each divider is pivotally attached to the trunk floor panel by a living hinge extending from that divider.

10. The vehicle trunk compartment cargo management system of claim 7, wherein each pocket of the backtrim member is defined by a plurality of walls, wherein one of the walls is shorter than another and wherein the backtrim pocket walls are shaped, sized and adapted such that their respective divider is capable of snapping into and snapping out of the pocket at the short wall.

11. The vehicle trunk compartment cargo management system of claim 7, wherein each divider is identically shaped and sized.

12. The vehicle trunk compartment cargo management system of claim 7, wherein each divider has an upper half and a lower half with a plurality of ribs positioned between both halves.

13. The vehicle trunk compartment cargo management system of claim 12, wherein the upper half of each divider, the lower half of each divider and the ribs are adapted to be sonically welded together.

14. A vehicle trunk compartment cargo management system comprising:
(a) a trunk floor panel having a pair of recesses for receiving a pair of dividers, a pair of recesses for receiving a pair of hinges, a pair of openings each of which opens on a bottom side of the trunk floor panel for receiving and securing a tongue of a knob and tongue lock, a pair of recesses for providing a hand access area between the trunk floor panel and a divider;
(b) a seatback having a pair of pockets, each said pocket being adapted to receive and secure a seatback flange extending from a divider oriented in an upright position, wherein said seatback defines a trunk compartment wall;
(c) a backtrim member aligned with and contiguous with another trunk compartment wall, said backtrim member having a pair of pockets, each said backtrim pocket being adapted to releasably receive and secure a backtrim flange extending from a divider oriented in an upright position; and
(d) a pair of dividers, each said divider being shaped to fit within a recess of the trunk floor panel, each said divider being pivotally attached to the trunk floor panel with a hinge, said hinge being positioned within a trunk floor panel hinge recess, such that each divider may pivot between an upright position perpendicular to the trunk floor panel and a closed position wherein each divider fits within a trunk floor panel divider recess such that the trunk floor panel and the divider have a common coplanar flat upper surface, each divider having a rotatable knob and tongue wherein the tongue extends from the knob and is shaped, sized and positioned to rotate into a tongue opening of the floor panel and to be positioned on the bottom side of the trunk floor panel for releasably securing the divider to the trunk floor panel, each divider having a seatback flange sized and shaped to fit within a seatback pocket such that the seatback flange secures the divider in an upright position to the seatback, each divider having a backtrim flange sized and shaped to fit within a backtrim member pocket such that the backtrim flange releasably secures the divider in an upright position to the backtrim member, each said divider being further shaped such that three sub compartments are formed within the trunk compartment when the dividers are pivoted into an upright position perpendicular to the trunk floor panel.

15. The vehicle trunk compartment cargo management system of claim 14, further comprising:
(a) at least two recesses within the trunk floor panel for receiving a locator stud extending from each divider;
(b) a pair of side panels forming two walls of the trunk compartment;
(c) at least one net anchor attached to each side panel, each said net anchor being adapted to releasably secure a cargo net;
(d) at least one locator stud extending from the outer periphery of each divider for receiving a net locator, each locator stud fitting within a trunk floor panel locator stud recess when the divider from which it extends is in a closed position;
(e) a net locator releasably attached to the at least one locator stud of each divider, each net locator being adapted to be releasably fit over a locator stud, each net locator being adapted to secure and position a net over the dividers when the dividers are in an upright position such that a net attached to the net locators covers the three sub compartments formed within the trunk compartment when the dividers are pivoted into an upright position perpendicular to the trunk floor panel; and
(f) a cargo net releasably attached to the at least one net anchor attached to each side panel and the at least one net locator attached to each divider such that the cargo net covers the three sub compartments formed within the trunk compartment when the dividers are pivoted into an upright position perpendicular to the trunk floor panel.

16. The vehicle trunk compartment cargo management system of claim 14, wherein each divider is pivotally attached to the trunk floor panel by a living hinge extending from that divider.

17. The vehicle trunk compartment cargo management system of claim 14, wherein each pocket of the backtrim member is defined by a plurality of walls, wherein one of the walls is shorter than another and wherein the backtrim pocket walls are shaped, sized and adapted such that their respective divider is capable of snapping into and snapping out of the pocket at the short wall.

18. The vehicle trunk compartment cargo management system of claim 14, wherein each divider is identically shaped and sized.

19. The vehicle trunk compartment cargo management system of claim 14, wherein each divider has an upper half and a lower half with a plurality of ribs positioned between both halves.

20. The vehicle trunk compartment cargo management system of claim 19, wherein the upper half of each divider, the lower half of each divider and the ribs are adapted to be sonically welded together.

* * * * *